_United States Patent_ [19]

Kikuchi et al.

[11] 4,329,047
[45] May 11, 1982

[54] OPTICAL VELOCITY MEASURING APPARATUS OF NON-CONTACT MEASUREMENT TYPE

[75] Inventors: Tetsuro Kikuchi; Hideaki Sasaya, both of Okazaki; Yasumasa Ishihara, Nagoya, all of Japan

[73] Assignee: Nippon Soken, Inc., Nishio, Japan

[21] Appl. No.: 114,598

[22] Filed: Jan. 23, 1980

[30] Foreign Application Priority Data

Feb. 8, 1979 [JP] Japan ................................. 54-14069

[51] Int. Cl.$^3$ ............................................. G01P 3/36
[52] U.S. Cl. ......................................... 356/28; 356/4
[58] Field of Search ................................ 356/1, 4, 28

[56] References Cited

U.S. PATENT DOCUMENTS

| | | | |
|---|---|---|---|
| 3,508,066 | 4/1970 | Agar | 356/28 |
| 3,799,671 | 3/1974 | Schweizer | 356/28 |
| 3,804,517 | 4/1974 | Meyr et al. | 356/28 |
| 4,091,275 | 5/1978 | Wilwerding | 356/4 |
| 4,167,330 | 9/1979 | Haville | 356/28 |

_Primary Examiner_—S. C. Buczinski
_Attorney, Agent, or Firm_—Cushman, Darby & Cushman

[57] ABSTRACT

An optical velocity measuring apparatus applicable to measurement of the velocity of a vehicle relative to the road. A pair of light sensors mounted on the bottom of the vehicle body spaced from each other in a direction of the movement of the vehicle respectively receive rays of light reflected from different spots on the road through an optical system and produce electric signals indicative of the surface conditions of the spots. A time lag from the detection of a particular spot by the forward light sensor until the backward light sensor detects the same spot is measured to determine the velocity of the vehicle. The optical system is comprised of first and second lenses each having a peripheral portion cut away by a plane parallel to the optical axis. The first and second lenses are aligned so that the cut away faces are in contact with each other and that the optical axes are in parallel to and spaced a predetermined distance from each other.

2 Claims, 6 Drawing Figures

OPTICAL VELOCITY MEASURING APPARATUS OF NON-CONTACT MEASUREMENT TYPE

BACKGROUND OF THE INVENTION

This invention relates to an optical velocity measuring apparatus for non-contact measurement type capable of optically measuring the velocity of an object moving relative to another, for example, the velocity of an automotive vehicle moving relative to a road surface, without making any physical contact with the road surface.

A known apparatus of this kind has comprised a first light sensor and a second light sensor disposed in a relation spaced apart by a predetermined distance from each other in a direction of traveling movement of a first object relative to a second object (which is, for example, a road surface) utilized for the measurement of the velocity of the first object relative thereto, an optical system for directing rays of light reflected from the surface of the second object toward the first and second light sensors which convert the incident rays of light into electrical signals, and means for evaluating the correlation (the time lag) between the electrical output signal from the first light sensor and that from the second light sensor thereby determining the velocity of the first object relative to the second object. In the prior art apparatus of this kind having such a construction, the optical system directing the rays of light reflected from the surface of the second object toward the first and second light sensors has included a single lens disposed in common to the first and second light sensors.

In an application of such a prior art optical velocity measuring apparatus of non-contact measurement type to an object such as an automotive vehicle, extreme difficulty has been encountered in the desired accurate measurement of the velocity of the vehicle when the vehicle is being accelerated or decelerated or traveling on a rough road, since the height of the vehicle is not maintained constant in such a case.

SUMMARY OF THE INVENTION

With a view to obviate the prior art difficulty pointed out above, it is a primary object of the present invention to provide an improved velocity measuring apparatus of the kind above described which can accurately optically measure the relative velocity, for example, the vehicle relative to the road surface, without being affected by the variations in the height of the vehicle.

In accordance with the present invention, there is provided an optical velocity measuring apparatus of non-contact measurement type comprising a first light sensor and a second light sensor disposed in a relation spaced apart by a predetermined distance from each other in a direction of traveling movement of a first object relative to a second object utilized for the measurement of the velocity of the first object relative thereto, an optical system for transmitting rays of light reflected from the surface of the second object to direct the same toward the first and second light sensors which convert the incident rays of light into electrical signals indicative of the surface conditions of the second object, and means for evaluating the correlation (the time lag) between the electrical output signal from the first light sensor and that from the second light sensor thereby determining the velocity of the first object relative to the second object, wherein the optical system comprises a first lens and a second lens for condensing the rays of light reflected from the surface of the second object and directing the same toward the first light sensor and the second light sensor respectively, the first and second lenses being partly cut away to be closely disposed opposite to each other at their cut-away surfaces, and a first axis connecting between the first light sensor and a first point (referred to hereinafter as a first visual point) at which the image of the first light sensor is formed on the surface of the second object by the first lens extends in parallel with a second axis connecting between the second light sensor and a second point (referred to hereinafter as a second visual point) at which the image of the second light sensor is formed on the surface of the second object by the second lens. The velocity measuring apparatus of the present invention having such a construction is advantageous over the prior art apparatus in that the distance between the first visual point and the second visual point does not vary or is maintained constant even when the distances from the surface of the second object to the first and second lenses are subject to variations. The apparatus according to the present invention is further advantageous in that the first and second light sensors can be disposed in close proximity to each other in such a manner as to cause the first and second visual points to move along the same path on the surface of the second object and that sufficiently condensed rays of light can be directed toward the first and second light sensors so as to reliably achieve the measurement of the velocity of the first object relative to the second object with high accuracy.

DESCRIPTION OF THE PREFERRED EMBODIMENTS

Preferred embodiments of the optical velocity measuring apparatus of non-contact measurement type according to the present invention will now be described in detail with reference to the drawings.

Figure 1:
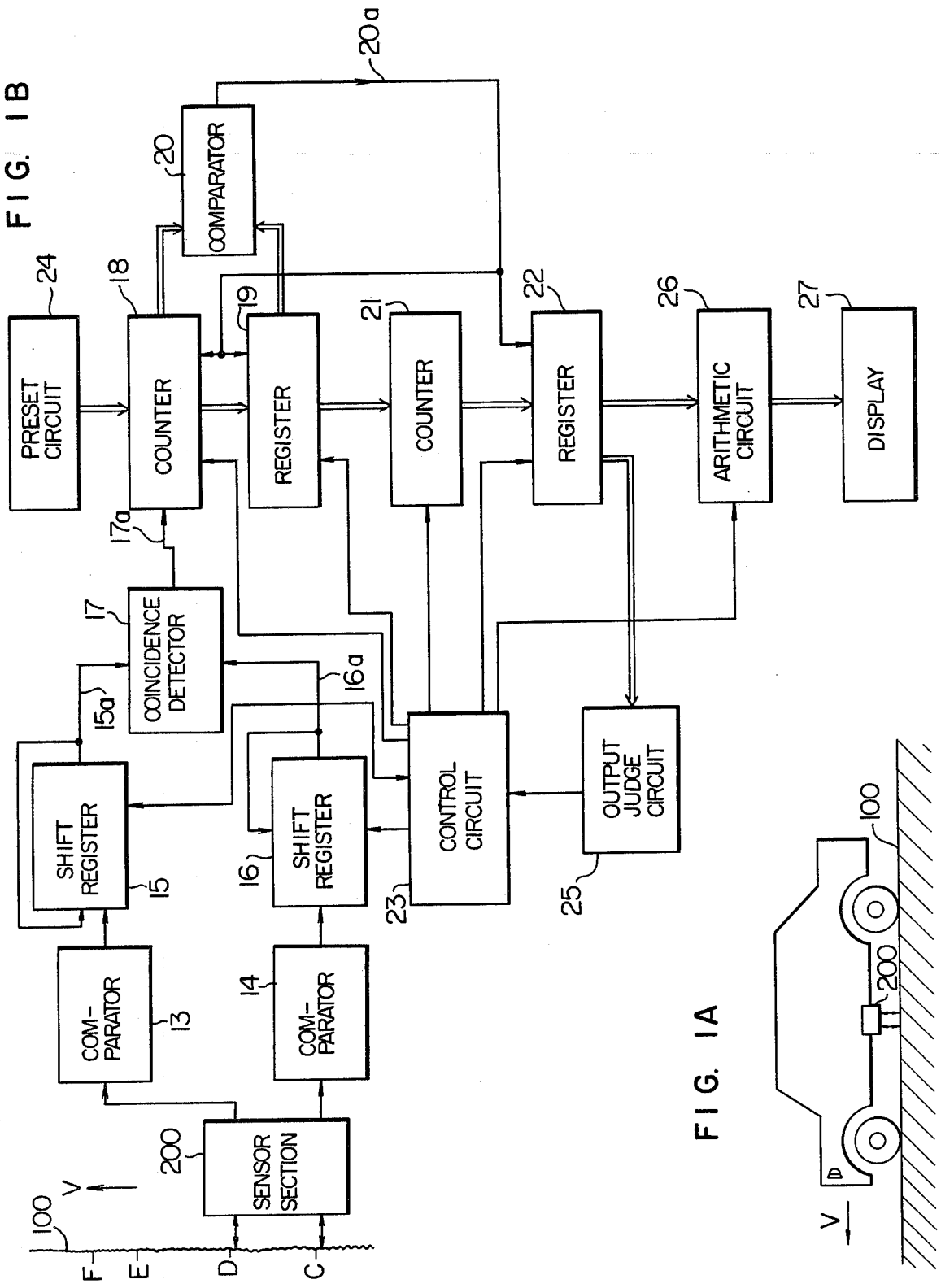
FIG. 1A is a schematic elevational view showing an application of the apparatus of the present invention to an automotive vehicle.
FIG. 1B is a block diagram showing the general structure of a preferred embodiment of the apparatus according to the present invention.
Figure 2:
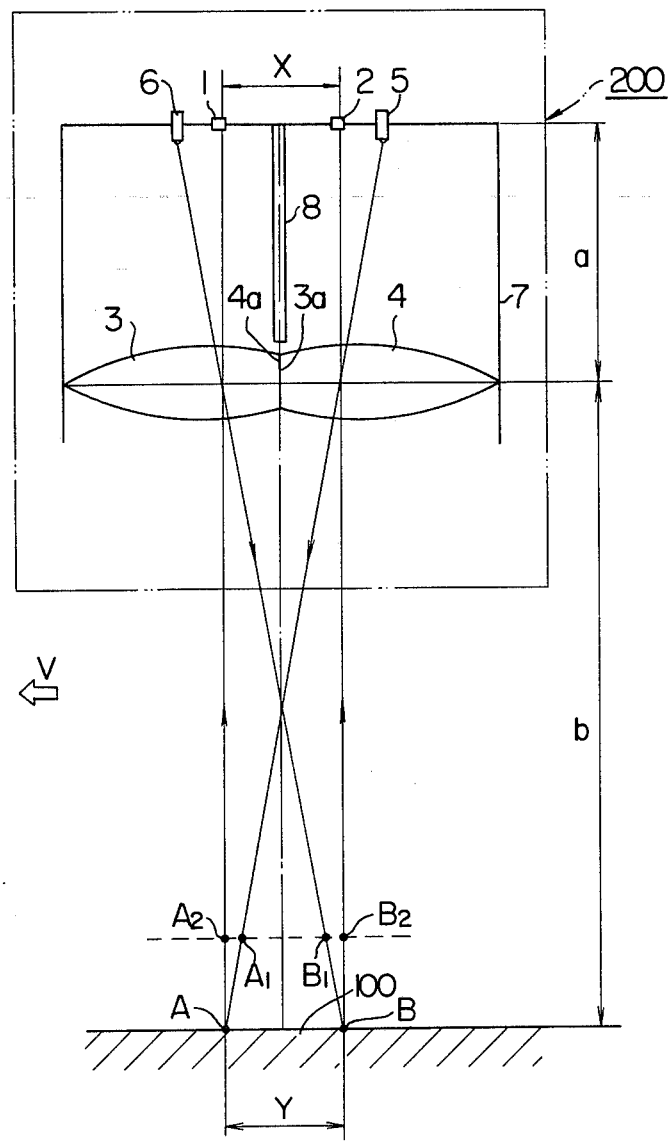
FIG. 2 is a schematic elevational view showing the arrangement of the optical system in the apparatus according to the present invention.

FIG. 1B is a block diagram showing the general structure of a preferred embodiment of the apparatus according to the present invention when especially adapted for the measurement of the velocity of an automotive vehicle relative to a road surface designated by 100. The apparatus according to the present invention comprises a sensor section 200 which is mounted on the vehicle body in a manner as shown in FIG. 1A and includes a first light sensor 1, a second light sensor 2, a first lens 3 and a second lens 4 as shown in FIG. 2. After the vehicle starts its traveling movement, the sensor section 200 mounted on the vehicle body moves together with the vehicle body at a velocity equal to the actual velocity V of the vehicle relative to the road surface 100 which is utilized for the measurement of the velocity of the vehicle. The length of time required for the first and second light sensors 1 and 2 to sense the conditions of the road surface 100 in one sensing cycle is very short compared with the rate of variation of the velocity of the vehicle relative to the road surface 100, and the relative velocity within that period of time can be regarded to be approximately constant. Suppose, therefore, that the first light sensor 1 senses the surface condition at a point D on the road surface 100 and the second light sensor 2 senses that at a point C on the road surface 100 at a given time. Then, the first light sensor 1 senses the surface condition at a point E on the road surface 100 and the second light sensor 2 senses that at the point D on the road surface 100 after the length of time $t = Y/V$, where Y is the distance between the points D and C or between the points D and E. Thus, when the velocity V of the vehicle is previously forecast, and the length of time T required for the sensors 1 and 2 to sense the surface conditions is selected to be $T > Y/V$ in order to find the actual velocity V of the vehicle, the first and second light sensors 1 and 2 will both sense the same road surface condition for the period of time $\Delta T = T - T/V$ after they start to sense the conditions of the road surface 100. Therefore, when the conditions of the road surface 100 are continuously sensed by the first and second light sensors 1 and 2 so as to find the time lag t with which the second light sensor 2 starts to sense the same surface condition as that sensed by the first light sensor 1, the actual velocity V at a given time can be calculated according to the equation $V = Y/t$, where t is the time lag.

The sensor section 200 including the first and second light sensors 1, 2 and the first and second lenses 3, 4 is disposed on the bottom portion of the body of the vehicle as seen in FIG. 1A. More precisely, this sensor section 200 is disposed in the area adjacent to the middle portion of the axle driving the rear wheels or along the centerline of the vehicle body in that area so that the portion of the road surface 100 sensed by the second light sensor 2 may not be different from the road surface portion sensed by the first light sensor 1 even when the vehicle runs along a curve or when the vehicle runs in a zigzag direction.

The structure of this sensor section 200 will be described in more detail with reference to FIG. 2. Referring to FIG. 2, the first light sensor 1 and the second light sensor 2 are spaced apart from each other by a predetermined distance X (which is experimentally proved to be preferably about 20 mm) in the advancing direction (toward the left in FIG. 2) of the vehicle. These two light sensors 1 and 2 are in the form of photo transistors, photo diodes or like photoelectric elements. The first lens 3 condenses light reflected from a first visual point A on the road surface 100 to direct the same toward the first light sensor 1, and the second lens 4 condenses light reflected from a second visual point B on the road surface 100 to direct the same toward the second light sensor 2. Each of these two lenses 3 and 4 is obtained by cutting away a portion of, for example, a circular lens 55 mm in diameter along a vertical plane extending through the lens at a distance of 10 mm from the center of the lens. It will be seen in FIG. 2 that the first lens 3 has a face 3a exposed by cutting, and the second lens 4 has a face 4a exposed by cutting. The first and second lenses 3 and 4 having such a shape are bonded together at these faces 3a and 4a by, for example, a bonding material, so that the distance Y between the first and second visual points A and B is maintained at about 20 mm. In this lens arrangement, a first axis connecting between the first light sensor 1 and the first visual point A and passing through the center of the first lens 3 extends in parallel with a second axis connecting between the second light sensor 2 and the second visual point B and passing through the center of the second lens 4. Therefore, even when the visual points A and B may shift to points $A_1$ and $B_1$ respectively due to a change in the height of the road surface 100, the light sensors 1 and 2 can receive the rays of light reflected from points $A_2$ and $B_2$ respectively. The distance between the points $A_2$ and $B_2$ is the same as that between A and B.

The distance X between the first and second light sensors 1 and 2 must be as short as possible in order that the portions of the road surface 100 sensed by the first and second light sensors 1 and 2 may not be different from each other when the vehicle runs along a curve. Suppose that the distance X between the first and second light sensors 1 and 2 is 20 mm, and that the first and second lenses 3 and 4 have a complete circular shape instead of the aforementioned partly cut-away shape. Then, the maximum diameter of each of these lenses 3 and 4 is 20 mm, and the rays of light reflected from the road surface 100 to be incident upon the first and second light sensors 1 and 2 through the first and second lenses 3 and 4 respectively will be insufficient in the intensity. In this embodiment, the focal distance f of the first and second lenses 3 and 4 is selected to be 70 mm, and the distance a between the first and second lenses 3, 4 and the first and second light sensors 1, 2 is selected to be 90 mm. Therefore, the distance b between the first and second lenses 3, 4 and the road surface 100 is 315 mm.

Light emitting elements 5 and 6 such as miniature bulbs are disposed in a relation spaced apart from each other by a distance of about 31.4 mm to illuminate the road surface 100 for facilitating the measurement of the velocity in the nighttime. In this embodiment, the first light emitting element 5 is arranged to illuminate only a limited area including the first visual point A and its vicinity, and the second light emitting element 6 is arranged to illuminate only a limited area including the second visual point B and its vicinity, so that the energy required for the illumination can be minimized. To deal with variations in the height of the road surface 100 as shown in FIG. 2, it is required that the first light emitting element 5 can illuminate the area around the point $A_1$ and including the point $A_2$, and the second light emitting element 6 can illuminate the area around the point $B_1$ and including the point $B_2$.

The first and second lenses 3 and 4 are fixedly supported within a cylindrical supporting member 7, and a shielding member 8 is provided so that the ray of light passed through the first lens 3 may not be incident upon the second light sensor 2, and that passed through the second lens 4 may not be incident upon the first light sensor 1. Further, a reflection preventive coating is applied to the surface of each of the first and second lenses 3 and 4 so that the beam of light emitted from the first light emitting element 5 may not be incident upon the second light sensor 2 by being reflected from the surface of the second lense 4, and that emitted from the second light emitting element 6 may not be incident upon the first light sensor 1 by being reflected from the surface of the first lens 3.

Figure 3:
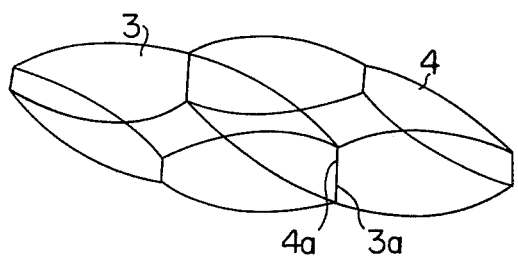
FIG. 3 is a schematic perspective view of a modification of the combination of the first and second lenses in the optical system shown in FIG. 2.

FIG. 3 is a schematic perspective view of a modification of the combination of the first and second lenses 3 and 4 shown in FIG. 2. According to this modification, the peripheral edges of these lenses 3 and 4 are cut away in a manner as shown in FIG. 3 so that the overall size of the sensor section 200 can be reduced without appreciably reducing the quantity of light directed toward the first and second light sensors 1 and 2. The lenses 3 and 4 shown in FIG. 3 may be of an integral structure instead of being separately prepared and bonded together.

Returning to FIG. 1B, a first comparator 13 converts the electrical output signal from the first light sensor 1 into a corresponding binary-coded digital signal, and a second comparator 14 converts the electrical output signal from the second light sensor 2 into a corresponding binary-coded digital signal. A first shift register 15 of N-bit capacity is connected at its input to the output of the first comparator 13, and a second shift register 16 of M-bit capacity is connected at its input to the output of the second comparator 14. In response to the application of an external command signal to the first and second shift registers 15 and 16, the digital output signals from the first and second comparators 13 and 14 are sampled at a predetermined sampling period of $\Delta t$, and the logic levels "0" and "1" of the sampled signals are successively registered in the shift registers 15 and 16. The periods of time required for the full registeration of data in the first and second shift registers 15 and 16 are $N \times \Delta t$ and $M \times \Delta t$ respectively. In this case, there is the relation $M > N$ between M and N, and the data sampled at the same time are sequentially supplied to the first positions of the first and second shift registers 15 and 16 respectively.

Signals 15a and 16b, each of which is a train of N bits and constitutes one read-out unit, are applied from the first and second shift registers 15 and 16 respectively to a coincidence detection circuit 17. This coincidence detection circuit 17 makes its coincidence detecting operation on the corresponding bits of the N-bit input signals 15a and 16a applied sequentially thereto so as to detect whether the logic levels of the corresponding bits of the N-bit signals 15a and 16a coincide with each other or not. As a consequence, a coincidence signal 17a appears from the coincidence detection circuit 17 and includes pulses representing the number of coincident logic levels in the N-bit signals 15a and 16a each of which is the read-out unit. This coincidence signal 17a is applied to a number-of-coincidence counter 18 which counts the number of coincident logic levels in the N-bit signals 15a and 16a read out from the first and second shift registers 15 and 16 respectively. Each time the counter 18 has counted the number of coincident logic levels in the N-bit signals 15a and 16a on the basis of the coincidence signal 17a applied from the coincidence detection circuit 17, its count output signal is applied to a maximum number-of-coincidence register 19 which registers the detected number of coincident logic levels in the signals 15a and 16a each of which is the read-out unit. A detected maximum value signal 20a is applied from a digital comparator 20 to the register 19 to renew the value registered already in the register 19 as required so that the maximum value of the number of coincident bits can always be registered in the register 19. Each time the coincidence detection circuit 17 has completed its coincident bit detecting operation on the N-bit signals 15a and 16a each of which is the read-out unit, a control circuit 23 described later applies a command signal to the second shift register 16 so that the data registered in this shift register 16 are shifted by bit position toward the left in FIG. 1B. A number-of-shift counter 21 counts the number of such data shifts. In this embodiment, the maximum number of such data shifts is $(M - N)$.

The detected maximum value signal 20a is applied also to a maximum number-of-coincidence shift register 22. In response to the application of the signal 20a from the digital comparator 20, the count of the counter 21 representing the number of data shifts is newly registered in this register 22. A control circuit 23 is provided for the operation timing control purposes. This control circuit 23 applies a command signal to both of the first and second shift registers 15 and 16 at time intervals of a predetermined period so that the digital output signals from the first and second comparators 13 and 14 can be sampled at the predetermined sampling period of $\Delta t$, and the logic levels of the sampled signals can be successively registered in the first and second shift registers 15 and 16 respectively. Under control of the control circuit 23, the N-bit signals 15a and 16a, each of which is the read-out unit, are applied from the shift registers 15 and 16 to the coincidence detection circuit 17 upon completion of the sampling operation, and then, the data registered in the second shift register 16 are shifted by one bit position. This operation continues until the number of such data shifts attains $(M - N)$. Further, the control circuit 23 applies a reset signal to the number-of-coincidence counter 18 each time the coincidence detection operation on the N-bit signals 15a and 16a, each of which is the read-out unit, has completed. Further, the control circuit 23 applies a reset signal to the maximum number-of-coincidence register 19, to the number-of-data shift counter 21 and to the maximum number-of-coincidence shift counter 22 each time the coincidence detecting operation on all the read-out units has completed.

A preset circuit 24 stores a suitable preset value therein. After all the read-out units of N bits have been read out and processed for the detection of the coincident bits, the detected maximum number of coincident bits registered in the maximum number-of-coincidence register 19 is compared with the preset value stored in the preset circuit 24. When the former value is smaller than the latter value, it is proved that the electrical output signals from the first and second light sensors 1 and 2 are remotely correlated to each other, and the result of velocity measurement is not reliable. In such a case, an alarm signal is generated, or the result of velocity measurement is cancelled.

An output judgement circuit 25 judges the output of the maximum number-of-coincidence shift register 22. When the maximum number of coincidence shifts registered in the register 22 after the completion of the coincidence detection processing on all the read-out units is larger than a first setting stored in the output judgement circuit 25, this circuit 25 judges that the relative velocity of the vehicle is lower than the expected value and applies a signal to the control circuit 23 so as to increase the sampling period $\Delta t$. When, on the other hand, the maximum number of coincidence shifts registered in the register 22 is smaller than a second setting stored in the output judgement circuit 25, this circuit 25 judges that the relative velocity of the vehicle is higher than the expected value and applies a signal to the control circuit 23 so as to decrease the sampling period Δt. In this manner, the output judgement circuit 25 applies a feedback signal to the control circuit 23 so as to maintain the sampling period Δt at its optimum value.

Immediately after the coincidence detecting processing on all the read-out units of N bits has completed, the signal indicative of the maximum number of coincidence shifts is applied from the register 22 to an arithmetic circuit 26. This arithmetic circuit 26 calculates the relative velocity of the vehicle on the basis of the above signal and the sampling period Δt together with the constant indicative of the distance Y between the first and second visual points A and B. A display circuit 27 converts the output signal of the arithmetic circuit 26 into an analog or digital display signal to provide an analog or digital display.

The operation of the apparatus of the present invention having the aforementioned construction will now be described in detail. While the vehicle is traveling on a road, the conditions of the road surface 100 sensed by the first and second light sensors 1 and 2 vary incessantly. The first and second light sensors 1 and 2 generate electrical output signals of levels corresponding to the quantities of light reflected from the road surface 100 and passed through the first and second lenses 3 and 4 respectively, and the first and second comparators 13 and 14 compare these electrical output signals from the first and second light sensors 1 and 2 with a predetermined setting to convert the same into binary-coded digital signals respectively. In response to the application of a sampling command signal to the first and second shift registers 15 and 16 from the control circuit 23 at a given time, the digital output signals from the first and second comparators 13 and 14 are sampled from that time at the predetermined sampling period of Δt, and the successive sampled data are registered in the first and second shift registers 15 and 16. The first shift register 15 operates from time $t=0$ to time $t=t_1$ ($=N \times \Delta t$) to register the data of the conditions of the road surface 100 between the point D and the point E. On the other hand, the second shift register 16 operates from time $t=0$ to time $t=t_2$ ($=M \times \Delta t$) to register the data of the conditions of the road surface 100 between the point C and the point F. Immediately thereafter, the sampled data signals 15a and 16a of N bits, each of which is one read-out unit, are read out from the first and second shift registers 15 and 16 to be applied to the coincidence detection circuit 17. The coincidence detection circuit 17 makes its coincidence detecting operation on the corresponding bits of the N-bit input signals 15a and 16a to detect the coincidence between the logic levels of the corresponding bits in the N-bit signals 15a and 16a, and the coincidence signal 17a including the pulses representing the number of coincident bits in the signals 15a and 16a appears from the coincidence detection circuit 17. The number-of-coincidence counter 18 counts the number of pulses of the signal 17a representing the number of coincident bits in the N-bit signals 15a and 16a each of which is the read-out unit. On the other hand, the digital comparator 20 compares the count of the counter 18 indicative of the number of coincident bits with the maximum number of coincident bits in the read-out unit of N bits registered already in the maximum number-of-coincidence register 19, and when the former value is larger than the latter value registered already in the register 19, the former value replaces the latter value and is registered as a new content of the register 19. At the same time, the digital comparator 20 applies the detected maximum value signal 20a to the maximum number-of-coincidence shift register 22 so that the number of shifts detected at that time is now registered in this register 22.

Upon completion of the coincidence detection processing on the N-bit signals 15a and 16a each of which is the read-out unit, the control circuit 23 acts to reset the number-of-coincidence counter 18 and acts also to shift the content of the second shift register 16 by one bit position. Then, the sampled data signals 15a and 16a of N bits are read-out again from the first and second shift registers 15 and 16 respectively to be subject to the coincidence detection processing in a manner similar to that described above. When the result of the coincidence detection processing on the N-bit signals 15a and 16a read-out now from the respective shift registers 15 and 16 proves that the number of coincident bits in the signals 15a and 16a is smaller than the maximum number of coincident bits registered already in the maximum number-of-coincidence register 19, no changes occur in the contents of the registers 19 and 22. In this manner, the coincidence detection processing is carried out on the (M=N) read-out units in sequence. Upon completion of the above operation, the information representing the maximum number of coincidence shifts $P_{max}$ is supplied from the maximum number-of-coincidence shift register 22 to the arithmetic circuit 26. The arithmetic circuit 26 calculates the actual velocity V of the vehicle relative to the road surface 100 according to the equation $V = Y/(P_{max} \cdot \Delta t)$, and the display circuit 27 provides the digital or analog display of the calculated actual velocity V of the vehicle by any suitable one of known means. In the equation, Y represents the distance between the first and second visual points A and B, and Δt is the data sampling period.

Figure 4:
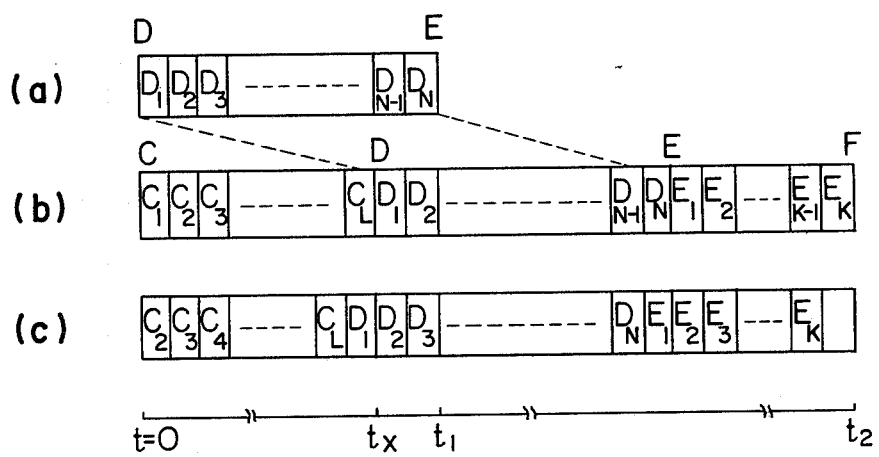
FIGS. 4(a-c) FIGS. 4(a-b) are time charts illustrating the operation of the apparatus of the present invention shown in FIG. 1B.

The mode of processing for the detection of coincidence between the corresponding data of the outputs from the first and second shift registers 15 and 16 will be described more concretely with reference to FIG. 4. FIG. 4 shows in (a) that sampled data $D_1$ to $D_N$ indicative of the conditions of the road surface 100 between the points D and E are registered in the N-bit positions respectively of the first shift register 15 of N-bit capacity. Also, FIG. 4 shows in (b) that sampled data $C_1$ to $C_L$, $D_1$ and $D_N$ and $E_1$ to $E_K$ indicative of the conditions of the road surface 100 between the points C and F are registered in the M-bit positions respectively of the second shift register 16 of M-bit capacity. FIG. 4 shows in (c) that the sampled data registered in the second shift register 16 are shifted by one bit position toward the left.

According to the processing mode shown in FIG. 4, the train of data registered in the N-bit positions of the first shift register 15 are read-out as a unit, and the train of data registered in the corresponding N-bit positions of the second shift register 16 are also read-out as a unit, for the detection of coincidence between the N sampled data registered in the first and second shift registers 15 and 16. In the first step of detection of coincidence, the data $D_1$ and $C_1$ are compared with each other, the data $D_2$ and $C_2$ are then compared with each other, ..., and finally, the data $D_N$ and $D_2$ are compared with each other as shown in (a) and (b) of FIG. 4 so as to detect the number of coincident logic levels of these data. In the second step of coincidence detection, the data registered in the second shift register 16 are shifted by one bit position toward the left, and then, the data $D_1$ and $C_2$, the data $D_2$ and $C_3$, ..., the data $D_N$ and $C_3$ are compared with each other as shown in (a) and (c) of FIG. 4 so as to detect the number of coincident logic levels of these data. It can be seen that, in the embodiment of the present invention, the number of coincident logic levels of data in one read-out unit pair of N bits attains its maximum value in the Lth step of coincidence detection in which the data registered in the second shift register 16 are shifted by L bit positions from the initial state. Thus, there is a time lag $t_x = L \times \Delta t$ until the sampled data $D_1$ to $D_N$ registered in the second shift register 16 are compared with the same sampled data $D_1$ to $D_N$ registered in the first shift register 15.

Figure 5:
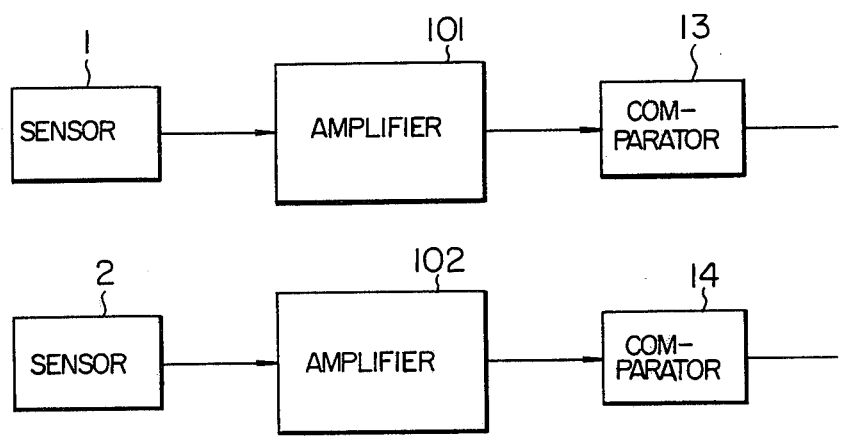
FIG. 5 is a partial block diagram showing a partial modification of the apparatus of the present invention shown in FIG. 1B.

In the aforementioned embodiment of the present invention, the amplification factor of the first and second light sensors 1 and 2 generating the electrical output signals is maintained constant independently of the intensity or quantity of light reflected from the road surface 100. However, due to the fact that the intensity of light reflected from a road surface is generally variable depending on the degree of maintenance of the road, on the daytime or nighttime, on the weather condition such as rainy weather, cloudy weather or clear weather, and on other factors, the amplitude of the sensor output signals may fluctuate over a considerably wide range. A partial modification for preventing such an undesirable excessive fluctuation of the signal amplitude is shown in FIG. 5. Referring to FIG. 5, automatic gain control amplifiers 101 and 102 are connected between the first light sensor 1 and the first comparator 13 and between the second light sensor 2 and the second comparator 14 respectively so that the velocity of the vehicle can be reliably measured at the optimum condition. Logarithmic amplifiers may be used in place of the automatic gain control amplifiers 101 and 102 to achieve the function similar to that above described.

We claim:

1. An optical velocity measuring apparatus of non-contact measurement type comprising:
    a first light sensor and a second light sensor both disposed on a first object in a relation spaced apart by a predetermined distance from each other in a direction of traveling movement of said first object relative to a second object, said first and second light sensors receiving rays of light reflected from the surface of said second object and converting the incident rays of light into electrical signals indicative of the surface conditions of said second object;
    a first lens and a second lens for condensing the rays of light reflected respectively from first and second visual points on the surface of said second object and directing the same toward said first light sensor and said second light sensor respectively, said first and second lenses being partly cut away by a plane parallel to the optical axis at a predetermined distance therefrom to be closely disposed opposite to each other at their cut-away portions to reduce a distance between said first and second visual points corresponding to a distance between optical axis of said first lens and said second lens while ensuring bright rays of light to be received by said first and second light sensors, such that said first and second visual points move along substantially the same path on the surface of said second object irrespective of irregularities in a relative movement and relation position between said first object and said second object, and a first axis connecting between said first light sensor and a first point at which the image of said first light sensor is formed on the surface of said second object by said first lens extends in parallel with a second axis connecting between said second light sensor and a second point at which the image of said second light sensor is formed on the surface of said second object by said second lens;
    means for evaluating the time-dependent relation between the electrical output signal from said first light sensor and that from said second light sensor thereby determining the velocity of said first object relative to said second object; and
    a first light source (5) and a second light source (6) aligned along a line connecting said first and said second light sensors (1, 2) and located respectively outside of and spaced from said second light sensor (2) and said first light sensor (1) such that said first light source (5) illuminates through said second lens (4) said first visual point (A) and vicinity thereof and said second light source (6) illuminates through said first lens (3) said second visual point (B) and vicinity thereof.

2. An optical velocity measuring apparatus of non-contact measurement type comprising:
    a first light sensor and a second light sensor both disposed on a first object in a relation spaced apart by a predetermined distance from each other in a direction of traveling movement of said first object relative to a second object, said first and second light sensors receiving rays of light reflected from the surface of said second object and converting the incident rays of light into electrical signals indicative of the surface conditions of said second object;
    a first lens and a second lens for condensing the rays of light reflected respectively from first and second visual points on the surface of said second object and directing the same toward said first light sensor and said second light sensor respectively, said first and second lenses being partly cut away by a plane parallel to the optical axis at a predetermined distance therefrom to be closely disposed opposite to each other at their cut-away portions to reduce a distance between said first and second visual points corresponding to a distance between optical axis of said first lens and said second lens while ensuring bright rays of light to be received by said first and second light sensors, such that said first and second visual points move along substantially the same path on the surface of said second object irrespective of irregularities in a relative movement and relation position between said first object and said second object, and a first axis connecting between said first light sensor and a first point at which the image of said first light sensor is formed on the surface of said second object by said first lens extends in parallel with a second axis connecting between said second light sensor and a second point at which the image of said second light sensor is formed on the surface of said second object by said second lens;
    means for evaluating the time-dependent relation between the electrical output signal from said first light sensor and that from said second light sensor thereby determining the velocity of said first object relative to said second object;

wherein said first lens and said second lens are disc-shaped convergent lenses having the same focal length and having a larger diameter than the distance between said first and said second visual points on the surface of said second object and a peripheral portion of each of said first and second lenses is cut away, and said first and second lenses are aligned in contact with each other at the cut away surfaces so that the optical axes thereof are in parallel with each other and said first light sensor and said second light sensor are respectively aligned with the optical axes, and a first light source (5) and a second light source (6) aligned along a line connecting said first and said second light sensors (1, 2) and located respectively outside of and spaced from said second light sensor (2) and said first light sensor (1) such that said first light source (5) illuminates through said second lens (4) said first visual point (A) and vicinity thereof and said second light source (6) illuminates through said first lens (3) said second visual point (B) and vicinity thereof.

* * * * *